United States Patent

Molloy et al.

[11] Patent Number: 5,916,361
[45] Date of Patent: Jun. 29, 1999

[54] GLASS FIBER REINFORCED CEMENT COMPOSITES

[75] Inventors: Henry J. Molloy, Hutchins; John Jones, Lancaster, both of Tex.

[73] Assignee: Henry J. Molly & Associates, Inc., Hutchins, Tex.

[21] Appl. No.: 08/134,002

[22] Filed: Oct. 12, 1993

[51] Int. Cl.⁶ .................................................. C04B 24/04
[52] U.S. Cl. .................. 106/696; 106/724; 106/728; 106/737; 106/819; 106/823
[58] Field of Search .................... 106/711, 724, 106/728, 819, 823, 737, 696

[56] References Cited

U.S. PATENT DOCUMENTS

| | | | |
|---|---|---|---|
| 3,351,478 | 11/1967 | Dodson et al. | 106/90 |
| 3,536,507 | 10/1970 | Klein et al. | 106/92 |
| 4,118,242 | 10/1978 | Kjohl et al. | 106/823 |
| 4,210,455 | 7/1980 | Metcalf et al. | 106/90 |
| 4,230,502 | 10/1980 | Lustig et al. | 106/823 |
| 4,419,136 | 12/1983 | Rice | 106/89 |
| 4,455,169 | 6/1984 | Chatterji et al. | 106/93 |
| 4,501,830 | 2/1985 | Miller et al. | 523/401 |
| 4,534,796 | 8/1985 | Massol | 106/711 |
| 4,798,628 | 1/1989 | Mills et al. | 106/104 |
| 4,861,375 | 8/1989 | Nakano et al. | 106/90 |
| 4,861,378 | 8/1989 | Watanabe et al. | 106/823 |
| 4,904,503 | 2/1990 | Hilton et al. | 427/373 |
| 4,961,790 | 10/1990 | Smith et al. | 106/823 |
| 4,992,104 | 2/1991 | Boutevin | 106/724 |
| 5,108,511 | 4/1992 | Weigland | 106/728 |

FOREIGN PATENT DOCUMENTS

| | | | |
|---|---|---|---|
| 1065127 | 6/1976 | Japan | 106/711 |
| 0103428 | 8/1979 | Japan | 106/711 |
| 0156361 | 9/1982 | Japan | 106/711 |
| 0155239 | 7/1986 | Japan | 106/728 |
| 2033367 | 5/1980 | United Kingdom | 106/728 |

*Primary Examiner*—Paul Marcantoni
*Attorney, Agent, or Firm*—Emch, Schaffer, Schaub & Porcello Co., L.P.A.

[57] ABSTRACT

This development produces a rapid hardening hydraulic cement, (RHHC) composite, which has less free lime to develop calcium hydroxide, and an additive, which has three components. One—a pozzolan, to combine with the lime left in the cement; Two—a plasticizer for workability, and Three—a retarder to control the set time of the resulting mix (Zircrete). The significance of the combination of the components is the development of stable properties in a glass fiber reinforced cement matrix in a fully aged or cured condition.

15 Claims, No Drawings

GLASS FIBER REINFORCED CEMENT COMPOSITES

TECHNICAL FIELD

This invention relates to glass fiber reinforced cement composites. More particularly, it relates to an additive package that improves the properties and characteristics of composites based on rapid hardening hydraulic cement (RHHC).

BACKGROUND ART

When using glass fiber to reinforce cement there is a loss of flexural strength and ductility as the cement cures, (ages), or as they say hydrates. This occurs in a moist environment which includes almost everywhere except in a conditioned space where the humidity is controlled, or the desert.

What causes this is as the cement cures it develops a number of by-products one of which is calcium hydroxide. This material migrates into the bundle of filaments, (strand), and physically glues all of them together reducing their ability to accept a bending strain. The strand then loses some reinforcing efficiency, and since the strands are oriented in all directions the resulting loss is significant. For example, the flexural strength diminishes from about 3600 psi. to 1200 psi., and the strain capacity down to 0.04 from 1.0.

Numerous solutions have been tried by the glass companies, cement companies, scientists and others. All solutions have tried to interrupt the movement of calcium hydroxide into the strand. Special coatings have been applied to the glass strand, pozzolans have been added to the mix, new cements have been developed and polymers have been added to the mix. All have some negatives associated with them so that they are not universally accepted, or satisfactory in production. For example, new cements have minimized the development of calcium hydroxide. But, this is not popular because the new cement has a very strict curing requirement and is expensive. Another solution adds metakaoline and a polymer to portland cements. This yields somewhat improved retained strengths.

DISCLOSURE OF INVENTION

The solution developed utilizes a commercially available rapid hardening hydraulic cement, (RHHC), which has less free lime to develop calcium hydroxide, and an additive, which has three components. One—a Pozzolan, to react with the lime and other components left in the cement; Two—a plasticizer for workability, and Three—a retarder to control the set time of the resulting mix. The compatibility of the three components is important since they must be powder and be chemically compatable.

The significance of the combination of the components is the development of stable properties in a glass fiber reinforced cement matrix in a fully aged or cured condition. Additionally the resulting product is non-combustible, is easy to cure and works easily.

BEST MODE OF CARRYING OUT INVENTION

Our development, named Zircrete is a composite based on rapid-hardening hydraulic cement (RHH cement), silica sand, additives, water, and AR glass fiber containing 20% zirconia.

The rapid hardening cement is based on Calcium sulphoaluminate compound. There are currently two U.S. manufacturers of suitable cement, CTS Manufacturing Co. and Blue Circle Cement Co.. An ASTM standard for rapid-hardening hydraulic cement should be issued by the end of 1993.

Preferably, the silica sand meets ASTM C144 and has a gradation suitable for spray processing (all particles passing US sieve #30 and most retained by US sieve #50). A sand with rounded particles is preferred for improved workability.

The additive, in addition to improving long term properties, provides retardation and slurry slump enhancement. A slurry slump suitable for spraying and premixing is obtained at recommended water/cement (w/c) ratio of 0.43 to 0.45. Reducing or increasing the slurry slump is achieved by adjusting the water content, although the w/c ratios should not be reduced below 0.43 or increased over 0.5. Working within these limits should provide an adequate range of practical slumps. Without retardation the system will harden very quickly. To allow adequate working time a retarder has been incorporated in the additive. The amount of retarder is varied in different additive packages to provide different set times. The plasticizer and retarder have been specially chosen for their compatibility. Retarders usually used with portland cement typically do not retard Zircrete.

Our additive includes, based on the weight of cement, pozzolan up to 20%; set retarder up to 4% and plasticizer up to 3%.

The pozzolan is any material such as metakaoline or silica fume.

The set retarder is any material such as citric acid, sodium citrate or sugar with citric acid being preferred.

The plasticizer is a modified lignosulphonate or other material.

Preferably, the amounts of these materials, based on the weight of cement is: pozzolan 0.5–15%; set retarder 0.1–3% and plasticizer 0.1–3%.

While our additive may work well in any type of cement, we have found it to work especially well in RHH cement.

The pozzolan or burnt clay preferably is finely divided silica or alumina/silica containing materials.

The broad class of citric acids is hydroxy acids and their salts. The salts usually can be sodium, sulfur or methyl (alkyl) salts. The acids can be straight chain or cyclic. We prefer straight chain hydroxy acids with one or more acid groups represented by the formula

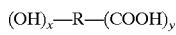

wherein R is an alkyl group containing 1 to 20 carbon atoms, x is an integer from 1 to 3 and y is an integer from 1 to 5.

Citric acid is represented by the formula:

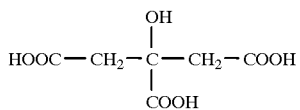

Other examples are: glycolic acid, thioglycolic acid, latic acid, malic acid, thiomalic acid, tartic acid, citric acid, salicylic acid, sodium salicylate, methyl salicylate (oil of wintergreen), gallic acid (tanning agent), mandelic acid (bitter almonds) and cinnamic acid.

The water reducing agent is a modified lignosulfonate. The material can be sulfonated melamine formaldehyde condensates, sulfonated naphthalene formaldehyde condensates, certain organic acids, lignosulfonates, and/or blends thereof.

The lignosulfonate polymers we use may have an average molecular weight of approximately 3,000 to 5,000 with the molecular weight distribution ranging from a few hundreds to 100,000. The molecule is a polymer of substituted phenyl-propane unit with hydroxyl (OH), methoxy (OCH$_3$), phenyl ring (C$^6$H$^6$), and sulfonic acid (SO$^3$H) groups. Lignosulfonate is obtained as a waste liquor during the production of paper-making pulp from wood whose composition may include from about 20% to about 30% of lignin Lignosulfonate contains a complex mixture of sulfonation products of lignin, decomposition products of celulose and lignin, various carbohydrates and free sulfurous acid and sulfates. Lignosulfonates are also available commercially as their sodium of calcium salts. See U.S. Pat. No. 4,961,790.

Regarding the alkali resistant glass fibers, we prefer Nippon Electric Glass Company NEG AR glass fiber products containing 20% zirconia. See U.S. Pat. No. 4,140,533.

Both spray-up and premix related processes can be used to manufacture Zircrete products. We add materials in the following order: water, sand, additive, then cement. Mixing must be for the minimum amount of time needed to obtain a uniform slurry. Excess mixing can overheat the mix and accelerate setting of the cement. When using a high shear mixer, mixing time should be kept to less than 30 seconds. The slurry can false set so we recommend that after initial mixing the slurry be allowed to stand for two minutes and then remixed for a further 5 seconds.

We also recommend that chilled water (maximum temperature 60° F.) be used and the slurry temperature be kept below 60° F. Typical mix formulations are:

|  | Mix (a) | Mix (b) |
|---|---|---|
| RHH cement | 88 lbs (1 bag) | 88 lbs |
| sand | 100 lbs (1 bag) | 88 lbs |
| water | 39.6 lbs (w/c-0.45) | 39.6 lbs (w/c-0.45) |
| additive (prepackaged) | 7.1 lbs (1 bag) | 7.1 lbs |

Mix (a) is based on using bagged weights. Although the sand/cement ratio is slightly different between the two mixes this has not been found to affect properties noticeably.

These formulations give a mix with a slurry of 6 rings (ref slump tester spec. in PCI manual MNL 130). The slurry may appear somewhat stiffer or different from a portland cement GFRC spray-up slurry. It is important to remember that the Zircrete slurry will fluidize when pumped and sprayed.

If after making initial batches and trial sprayings a wetter or drier mix can be achieved by adjusting the water content. but, this should not be reduced below 0.43 w/c or above 0.5 w/c. The additive to cement ratio must not be varied from that recommended for the particular additive package being used, as the long term properties will be affected. The additive packages are sized to be used with an 88 lb bag of cement.

Spraying Zircrete is basically the same as for conventional portland cement GFRC. The only difference is that Zircrete is a fast setting system and when a mix is made it should be used as quickly as possible and not be allowed to stand more than a few minutes. If spraying is interrupted the mix should be kept circulating through the pump until spraying can recommence or be discarded.

A thixotropic aid such as methyl cellulose may be added for spraying vertical surfaces.

When premixing, batch materials should be added in the following order: water, sand, additive, cement and when the slurry is thoroughly mixed the glass fibers are added gradually to ensure uniform fiber dispersion. Because premix is usually cast immediately after mixing, the fast set of Zircrete is often a benefit and minimum retardation additive is used to achieve short demold time.

The initial drying shrinkage of Zircrete is less than that of portland cement. However, shrinkage can occur, of a magnitude similar to portland cement, if the system experiences any significant loss of water up to and during the hardening phase. Therefore, water/cement ratios less than 0.43 should be avoided. Very high water/cement ratios will, like portland cement, cause increased shrinkage. It is recommended that water/cement not exceed 0.50. As with other cements, we recommend that the Zircrete products be kept wet until hardening has taken place.

The set time of Zircrete is controlled by the additive, the temperature of the mix water, and the slurry temperature. The additive usually used for spray-up has the maximum amount of retardation and if used with water at or below 60° F. and the slurry temperature is kept at or below 60° F. it will give a set time of between 1.5–3 hours depending on the ambient temperature. With no retardation in the additive, the mix water at 60° F., the slurry temperature at 60° F. and ambient temperature of 70° F. the set time will be about 30 minutes or less. The use of hot water (over 100° F.) will cause set times in the order of a few minutes.

Zircrete will allow much faster demold than conventional fiber reinforced concrete. Once the initial hardening takes place and the exotherm occurs Zircrete rapidly gains strength. Table 1 shows the rate of gain of strength from initial set. Typically, small parts could be demolded within minutes of the onset of the exotherm whereas a large architectural panel may require leaving in the mold for a further hour or so before it will have reached sufficient strength for demold.

The following mix formulation was used to spray premix successfully:

| RHHC | 40 lbs |
|---|---|
| Silica sand | 40 lbs |
| Water | 18.5 lbs |
| Additive | 3.2 lbs |
| AR Glass fiber 1/2" (NEG ACS13H350Y) | 2 lbs (2%) |
| CMC pump aid | 7 gs |

Higher glass fiber contents also may be used.

The majority of architectural finishes that are used with conventional fiber concrete can be used with Zircrete.

TABLE 1

Rate of Gain of Strength of Zircrete

| Time | Compressive Strength psi | **Flexural Strength psi | P.E.L. psi |
|---|---|---|---|
| 0 hrs |  | 1458 | 506 |
| .5 hrs |  | 2050 | 650 |
| 1.0 hrs | 4500 | 2175 | 710 |
| 1.5 hrs |  | 2258 | 775 |
| 2.0 hrs |  | 2270 | 800 |
| 3.0 hrs | 6000 | 2340 | 860 |
| 5.0 hrs |  | 2420 | 900 |
| 8.0 hrs |  | 2510 | 930 |
| 24.0 hrs | 6500 | 2803 | 994 |
| 3 days | 6960 |  |  |
| 7 days | 7830 | 3193 | 1053 |
| 14 days |  | 3434 | 1053 |
| 28 days | 8990 | 3234 | 1064 |

Notes:
a--coupons wetted for 15 minutes when exotherm started
b--air cured with average temperature 70° F. at 60% RH
c--mix water temperature 65° F.
d--flexural testing according to ASTM C947-89
**(wet soak not possible)

The durability of GFRC using the Zircrete matrix and AR Glass was evaluated by performing flexural test on samples which had been artificially aged. Flexural coupons were immersed in hot water at either 50° C. or 60° C. for periods up to 183 days and tested periodically using ASTM C947-89 to measure flexural strength and strain capacity. Three different cement systems were considered.

The control composite was standard GFRC using Ordinary Portland Cement (OPC). It was included as a control for comparison to standard Practice. For OPC mixes, the water/cement ratio was 0.32 and the sand/cement ration was 1.0. Curing was accomplished by keeping the product wet for seven days, or with the addition of 5% acrylic co-polymer solids by weight of cement. OPC composites used AR glass. Composites with RHHC and RHHC with our additive were evaluated to determine any improvement in properties due to the additive. The additive is included to aid the "workability" of the system as well as increase long term properties. Again the sand to cement ratio was set at 1.0. RHHC cements require a higher water/cement ratio than OPC. A ratio of about 0.45 was used. Set time and plasticizers to enhance workability are also required. Curing is accomplished by keeping the product wet from initial set through exotherm.

Since common practice is to package RHHC cements in 88 pound bags, a sand/cement ratio of 1.0/0.88 was considered in addition to the ratio of 1.0/1.0. The performance of Zircrete utilizing AR glass fiber was known to be excellent, some boards were made with E glass to see if Zircrete with E glass performs satisfactorily. Tests showed that E glass fiber is not a suitable long term reinforcement in RHHC or RHHC with our additive.

A test board was produced using standard GFRC production spray up equipment for each test series. Test specimens were cut from the cured boards to conform with ASTM C947-89. The specimens were tested wet which results in about a 20% reduction in measured strength as compared to dry testing. All samples were allowed to cure for at least 28 days. Ten samples which had not been aged by immersion in hot water were then tested in Flexure, five samples with form side up and five samples with form side down. These samples corresponded to zero days aged. The remaining samples were placed in a hot water bath and removed for flexural testing at varying times. Each board was kept in a separate water bath.

EXAMPLE I

The first comparison shows the performance of OPC and Zircrete using AR glass. The proportional elastic limit of GFRC made with Zircrete and AR glass does not degrade with time. The Modulus of Rupture (MOR) of Zircrete also does not degrade, however, the MOR of OPC is substantially reduced due to immersion in hot water. The strain to failure does not deteriorate due to accelerated aging when Zircrete is used, whereas strain to failure is reduced to the strain corresponding to the proportional elastic limit when OPC is used. Typical load deflection curves for flexural coupons made with OPC and Zircrete, respectively, show ductile performance before accelerated aging. The aged curve for OPC is extremely brittle while the aged curve for Zircrete retains most of the ductility of the unaged material. The composite using RHHC and no additive also loses strength.

EXAMPLE II

The comparisons of the performance of Zircrete using both AR glass and E glass is also included. PEL is not affected by aging. As expected, E glass deteriorates in Zircrete. However, AR glass in Zircrete performs much better than E glass in Zircrete. In strain to failure results, E glass in Zircrete deteriorates rapidly. However, AR glass in Zircrete shows almost no loss in strain to failure.

EXAMPLE III

We also tested MOR and strain to failure results for both plain RHHC and Zircrete using AR glass fibers at 60° C. hot water. Plain RHHC showed some deteriotation in regard to MOR, whereas Zircrete showed stable MOR. RHHC shows a definite reduction in strain to failure due to aging whereas Zircrete exhibits no appreciable loss. Similar results also were achieved in 50° C. hot water.

We claim:

1. A controlled set cement product comprising rapid hardening hydraulic cement and an additive package of three materials wherein the additive package consists essentially of, based on the weight of cement:

| Material | Weight Percent |
| --- | --- |
| pozzolan | up to 20% |
| set retarder | up to 4% |
| plasticizer | up to 3% | wherein all three materials are present in the additive package.

2. The product of claim 1, wherein the additive package consists essentially of:

| Material | Weight Percent |
| --- | --- |
| pozzolan | 0.5 to 15% |
| set retarder | 0.1 to 3% |
| plasticizer | 0.1 to 3%. |

3. The product of claim 1, wherein the pozzolan is metakaolin or silica fume.

4. The product of claim 1, wherein the set retarder is citric acid, or sodium citrate.

5. The product of claim 1, wherein the plasticizer is a modified lignosulfonate.

6. The product of claim 1, wherein the plasticizer is a lignosulfonate polymer or a blend of lignosulfonate polymers.

7. A controlled set cement product comprising:

rapid hardening hydraulic cement;

silica sand;

water;

alkali-resistant glass fiber reinforcements; and an additive, wherein the additive consists essentially of, based on the weight of cement:

| Material | Weight Percent |
| --- | --- |
| pozzolan | up to 20% |
| set retarder | up to 4% |
| plasticizer | up to 3% | wherein all three materials are present in the additive.

8. The product of claim 7, wherein the additive consists essentially of:

| Material | Weight Percent |
| --- | --- |
| pozzolan | 0.5 to 15% |
| set retarder | 0.1 to 3% |
| plasticizer | 0.1 to 3%. |

9. The product of claim 7, wherein the pozzolan is metakaolin or silica fume.

10. The product of claim 7, wherein the set retarder is citric acid, or sodium citrate.

11. The product of claim 7, wherein the plasticizer is a modified lignosulfonate.

12. The product of claim 7, wherein the plasticize is a lignosulfonate polymer or a blend of lignosulfonate polymers.

13. The product of claim 7, wherein the alkali-resistant glass fiber reinforcements contain 20% by weight zirconia.

14. The product of claim 7, wherein the set retarder is a hydroxy acid or salt of a straight chain hydroxy acid represented by the formula:

$$(OH)_x-R-(COOH)_y$$

wherein R is an alkyl group containing 1 to 20 carbon atoms, x is an integer from 1 to 3, and y is an integer from 1 to 5.

15. The product of claim 7, wherein the set retarder is citric acid represented by the formula:

$$HOOC-CH_2-\underset{\underset{COOH}{|}}{\overset{\overset{OH}{|}}{C}}-CH_2-COOH$$

* * * * *